US008333337B2

(12) United States Patent
Nabih et al.

(10) Patent No.: US 8,333,337 B2
(45) Date of Patent: Dec. 18, 2012

(54) VALVE UNIT FOR INTERRUPTING OR RELEASING A FLOW OF A MEDIUM ALONG A HOLLOW DUCT, USE THEREOF IN A DOSING SYSTEM FOR THE METERED DISCHARGE OF SAID MEDIUM, AND METHOD FOR THE METERED DISCHARGE OF A MEDIUM

(75) Inventors: Othman Nabih, Stuttgart (DE); Dirk Schlenker, Stuttgart (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 707 days.

(21) Appl. No.: 12/443,062

(22) PCT Filed: Sep. 25, 2007

(86) PCT No.: PCT/EP2007/008330
§ 371 (c)(1),
(2), (4) Date: Nov. 6, 2009

(87) PCT Pub. No.: WO2008/037430
PCT Pub. Date: Apr. 3, 2008

(65) Prior Publication Data
US 2010/0051722 A1     Mar. 4, 2010

(30) Foreign Application Priority Data
Sep. 26, 2006   (DE) .......................... 10 2006 045 407

(51) Int. Cl.
*B05B 1/30* (2006.01)
(52) U.S. Cl. .................................. 239/585.1; 239/585.4
(58) Field of Classification Search ............... 239/585.1, 239/585.2, 585.3, 585.4, 584, 533.2; 251/129.15, 251/129.21, 127
See application file for complete search history.

(56) References Cited

U.S. PATENT DOCUMENTS

| 3,026,903 A | 4/1959 | Roach |
| 4,763,843 A | 8/1988 | Bombis et al. |
| 5,320,136 A * | 6/1994 | Morris et al. ................ 137/528 |
| 7,004,446 B2 * | 2/2006 | Petro et al. .................. 251/63.4 |

FOREIGN PATENT DOCUMENTS

DE     1 232 424     1/1967
(Continued)

*Primary Examiner* — Davis Hwu
(74) *Attorney, Agent, or Firm* — Antonelli, Terry, Stout & Kraus, LLP.

(57) ABSTRACT

A valve unit is disclosed for the interruption or release of a pressurized flow of a medium along a hollow duct, which flows along the hollow duct, as well as a preferred use of the valve unit in a dosing system and a method for the metered discharge of a medium from a cartridge-needle configuration, with a cartridge connected to the needle configuration via at least one hollow duct with an open cartridge end, to which a pressurizing means is applied, which is capable of driving the medium provided inside the cartridge in the direction of the needle configuration for discharge by applying pressure. The invention has at least in a section along the hollow duct in which at least one first magnet unit is mounted to be axially movable longitudinally along the flow direction of the medium through the hollow duct, for generating a first magnetic field, a second magnet unit providing second magnetic field interacting with the first magnetic field in such a way that a magnetic force which mutually attracts the magnet units axially acts between the first and the second magnet units, and a mechanical stop along the hollow duct, against which the first magnet unit is drivable using a retention force which may be generated by the magnetic force.

24 Claims, 3 Drawing Sheets

FOREIGN PATENT DOCUMENTS

| | | |
|---|---|---|
| DE | 28 39 774 | 3/1980 |
| DE | 38 02 658 A1 | 8/1989 |
| DE | 196 47 701 A1 | 5/1998 |
| EP | 0 213 516 A | 8/1986 |

* cited by examiner

VALVE UNIT FOR INTERRUPTING OR RELEASING A FLOW OF A MEDIUM ALONG A HOLLOW DUCT, USE THEREOF IN A DOSING SYSTEM FOR THE METERED DISCHARGE OF SAID MEDIUM, AND METHOD FOR THE METERED DISCHARGE OF A MEDIUM

CROSS-REFERENCE TO RELATED APPLICATION

Reference is hereby made to PCT/EP2007/008330 application, filed on Dec. 25, 2007, on which a claim for priority is based and further to German Application 10 2006 045 407.3, filed on Dec. 26, 2006, on which a claim for priority is also based which applications are incorporated herein by reference in their entirety.

BACKGROUND OF THE INVENTION

1. Field of the Invention

The invention relates to a valve unit for interrupting or releasing a flow of a pressurized medium along a hollow duct. Furthermore, the invention relates to the use of the valve unit in a dosing system for the metered discharge of the medium from a cartridge-needle configuration, whose cartridge is connected to the needle configuration via at least one hollow duct and has an open cartridge end, to which a pressurizing means is applied, which drives the medium in the cartridge in the direction of the needle configuration.

2. Description of the Prior Art

Devices according to the metered discharge of viscous media, preferably low, moderate, and high viscosity liquids, such as oils, greases, glues, and soldering pastes, to name only a few, which are also known in manifold forms under the title "dispenser", are used in greatly varying technical fields, such as precision engineering, nanotechnology, and microtechnology, and in particular areas of microelectronics, micro-optics, and micro-mechanics, and also in biotechnology and medical technology. Typical applications of dispenser systems of this type for moderate and high viscosity media relate, for example, to the exact discharge and positioning of extremely small adhesive droplets for joining in electronics manufacturing, the lubrication of bearings using oils and greases in mechanical engineering, preferably in the fields of micromechanics, and the continuous or cyclic delivery of reagents in the chemical industry or for purposes of analytical technology or also for administering extremely finely dosed liquid pharmaceuticals for patient care, in particular in intensive care.

An overview of available dispenser systems on the market for moderate and high viscosity media may be inferred from the article by F. Kohler Point for Point—the Technologies for the Dispensing of Soldering Pastes, published in "Productronic" (1991), issue 4, pages 18 through 20, which are particularly capable of generating and placing droplets, so-called dots, in the context of cyclic dispensing of media. For this purpose, differentiation between the following systems is required:

a) Time/Pressure Cartridge Dosing System

This system may be understood as the basic system, which is also used in identical or altered form in the dispenser systems explained briefly hereafter for the dosed provision of viscous media. The dispenser system identified as the basic system comprises a cartridge having a dispenser needle on the lower end and a pressure connection on the upper end of the cartridge. Via targeted pressure buildup in the upper end of the cartridge, a piston unit is pressed against the remaining cartridge volume, in which the viscous medium to be dispensed is located for discharge through the dosing needle. Cartridge/dispenser needle units are available as disposable articles and are to have a corresponding pressure attachment removably fixed.

b) Rotation-Screw Dosing Systems

So-called rotation-screw dosing systems provide a rotation screw, which may usually be driven via a geared motor, which is used as the delivery screw for the viscous medium to be discharged and is situated axially to the dispenser needle. The viscous medium to be dispensed is supplied longitudinally to the delivery screw at low pressure, for example, employing the time/pressure cartridge dosing system previously identified. Depending on the rotational velocity of the delivery screw implemented as the rotation screw, the volume flow of viscous medium discharged through the needle unit may be set to be extremely finely dosed.

c) Peristaltic Dispenser

A cartridge filled with viscous medium is again used for the targeted discharge of the medium at low pressure into a plastic tube, which provides two closable tube ends. If a closure is opened on one end, the media may flow out of the cartridge into the tube. The first closure is then closed and the second closure is accordingly opened, a plunger provided between the two closures acts on the tube to deliver the viscous medium through the second opening into a corresponding dispenser needle.

d) Piston Positive Displacement Dosing Systems

So-called piston positive displacement dosing systems typically have a cartridge filled with viscous medium, which conducts the medium at low pressure through a channel to a pump chamber, along which a piston is situated so it is movable, which generates a partial vacuum inside the pump chamber upon movement upward, by which the viscous material flows out of the cartridge into the pump chamber. When the piston moves downward, the material feed along the cartridge is interrupted and the piston presses the desired quantity of the medium out through a corresponding dispenser needle, which is situated axially from the pump chamber.

Dispenser systems briefly outlined above are fundamentally capable of discharging viscous media volume-dosed to local areas which may be predefined, but limits are set on the precision in regard to extremely small volume deliveries and the high-precision reproducibility of the delivered volume quantity in relation to the total emptying of a cartridge filled with viscous medium. The described dispenser systems and the use of cartridges thus offer a poor volume repetition precision, that is, the volumes of individual dots applied in sequence increasingly vary, particularly because on the one hand the viscosity of the material changes as a result of variations of humidity and temperature, and a corresponding change of the pressure value is accordingly necessary to dispense an equal volume. On the other hand, a change of the dispensed volume occurs if the same pressure is applied to the full cartridge as to the nearly empty cartridge. Thus, for example, the volume discharge from a cartridge at constant delivery pressure changes by up to 19% if a 10 $cm^3$ cartridge is used.

The above problems may be technically managed best using the piston positive displacement system identified in d), but systems of this type have the most complex designs and are thus the most costly. The dosing systems identified above also reach functional limits when attempting to miniaturize systems of this type.

In addition, known dispenser systems tend to drip upon lifting of the dosing needle after each material discharge, because the overpressure necessary along the dosing needle for the material discharge is not dissipated or is not dissipated in a timely enough manner.

Time-pressure cartridge dosing systems, as previously noted, are also known in which a switchable valve, which operates on an electromagnetic or piezoelectric basis and requires electrical current for activation, which finally results in heating of the system which interferes with an exact media discharge, in particular if extremely small material quantities in the nanometer range are administered, between the cartridge storing the medium to be dispensed and the needle configuration. In addition, switchable flow valve systems of this type usually have large installation sizes, because of which integration and in particular application in micro-dosing systems is only possible in a restricted way. Furthermore, the closing procedure results in a temporary pressure buildup inside the needle in valves known per se because of the design, which results in dripping, which is to be avoided. In addition, flow valve systems known up to this point are either suitable for flow interruption of gaseous media or for liquid media. A valve system which is capable of controlling media having either liquid or gaseous aggregate state is currently not known. Finally, the production costs connected with the known valves are significant.

The device described in DE 2839774 A1 for setting the flow cross-section of a valve is based on a permanent magnet, held via an axial thread, being set in rotation uniformly by pivoting an annular magnet radially enclosing the permanent magnet, by which the internal permanent magnet may be axially positioned by the thread guide. The internal permanent magnet is connected to a conical pin, which is capable of closing a valve opening as a function of the axial position of the permanent magnet.

DE 38 02 658 A1 describes a solenoid valve whose mode of operation is determined by the axial position of a permanent magnet mounted so it is axially movable to the hollow duct. Because of the magnetic conditions of the permanent magnets present in the solenoid valve, the valve configuration remains open in a basic position unloaded by external force actions, particularly because the axially movable magnet unit experiences an axially acting repelling force due to the magnet unit also being provided in the hollow duct. In contrast, if a corresponding axially acting flow pressure or volume flow V acts on the valve seat 3, it is axially displaced and moved against a valve needle until a maximum volume flow transfers the valve unit into a closed state. Due to the shaping of the valve body and the desired significant longitudinal mobility of the valve seat in the axial direction, the known solenoid valve may especially advantageously be used as a magnetic regulating valve. Optical sensors are provided for this purpose along the cavity wall to detect the axial position of the valve seat.

SUMMARY OF THE INVENTION

The invention is a valve unit, using a switch media having either liquid or gaseous aggregate state, and with high precision and defined opening and closing behavior. The valve unit is preferably suitable for use in a dosing system for the metered discharge of a medium from a cartridge-needle configuration. The following requirements are to be fulfilled: The dosing is to be performed very dynamically, that is, if a valve opening signal or valve closing signal exists, the most rapid possible media discharge or ending of the discharge, respectively, is to occur. The media discharge is to be as flexible as possible regarding cyclic and continuous discharge, that is, a change between punctual and linear media discharge is to be possible during a running dispensing procedure. Furthermore, after the media discharge, it is ensured that dripping of the medium still located in the needle is to be avoided. The design construction of the valve unit is to be simple and cost-effective to produce, furthermore, simple cleaning of the valve unit. The valve unit is implemented modularly in various systems with the highest possible degree of integration.

The valve unit according to the invention for the interruption or release of a flow of a medium along a hollow duct, which flows in a pressurized state along the hollow duct includes at least in a section along the hollow duct, at least one first magnet unit, which is mounted so to be axially movable longitudinally in the flow direction of the medium through the hollow duct generating a first magnetic field. Furthermore, a second magnet unit is provided with a second magnetic field which interacts with the first magnetic field in such a way that a magnetic force which mutually attracts the magnet units, acts between the first and the second magnet units. In addition, a mechanical stop is provided along the hollow duct, against which the first magnet unit is drivable using a retention force which may be generated by the magnetic force. The at least one first magnet unit assumes an axial position, exclusively in which the at least one first magnet unit seals the hollow duct fluid-tight, while the medium loads the at least one first magnet unit which is pressurized axially against the direction of action of the retention force. Finally, a unit actuates the valve unit, that is to open or close the valve unit, using a variable pre-definable force acting on the at least one first magnet unit against the retention force. This unit may be implemented to vary the pressure application on the medium. If a flow pressure acting through the medium is set, which is slightly above the magnetic retention force, the axially movable at least one first magnet unit is driven into a position opening the valve unit, but if the flow pressure of the medium drops below the magnetic retention force, the at least one first magnet unit moves spontaneously into the closed position of the valve unit. Thus, no additional energy expenditure is needed to actuate the valve unit, except for applying a suitably selected flow pressure variance to the magnetic retention force of the valve unit to the medium flowing through the valve unit.

Alternatively, a magnet unit, in the form of a permanent magnet or electromagnet unit, may be provided for opening and closing the valve unit, which is situated separately from the hollow duct and generates an external magnetic field, which may be caused to interact with the at least one first magnet unit and helps to deflect the at least one first magnet unit in a controlled way against the retention force. For example, if the external magnet unit is approached in the direction of the valve unit, the effective external magnetic field increases in the area of the at least one first magnet unit, by which the magnetic force prevailing between the at least one first and second magnet units is reduced by the external magnetic force. The unchanged pressure loading the movable at least one first magnet unit by means of the fluidic pressurizing means is capable of spacing the at least one first magnet unit apart from the second magnet unit against the reduced magnetic retention force, by which the valve unit is opened. If the external magnet unit is moved away from the valve unit again, in contrast, the magnetic retention force dominates and pulls the at least one first magnet unit back against the mechanical stop, by which the hollow duct is closed to be fluid-tight.

The use of the valve unit, which is explained in the context of a dosing device, makes possible performing a medium discharge via a cartridge-needle configuration with extremely high precision.

The dosing system implemented according to the invention for the metered discharge of a medium from a cartridge-needle configuration, whose cartridge is connected to the needle configuration via at least one hollow duct and includes one open cartridge end, which a pressurizing means loads. The medium stored inside the cartridge is driven in the direction of the needle configuration for discharge by applying pressure, and includes at least one solenoid valve unit between the cartridge and the needle configuration along the hollow duct, which seals the hollow duct fluid-tight. This unit exclusively acts under application of a magnetic retention force which acts between two magnet units, as described in detail hereafter, which are capable of sealing the hollow duct provided between the needle configuration and the cartridge fluid-tight. On the other hand, the pressure force generated by the pressurizing means acting on the medium loads at least parts of the solenoid valve, which remains closed against the pressure force by the magnetic retention force until the pressure force rises above the magnetic retention force. In this case, the valve abruptly passes into an open position, so that the medium, which may either be gaseous or also low, moderate, or high viscosity, may flow through the valve configuration to the needle configuration, from which the medium may be discharged onto a substrate surface, for example.

A dosing of the medium discharge by the dosing system according to the invention is thus performed by regulation of the pressure application on the pressurizing means on the medium stored in the cartridge in such a way that the pressure force acting along the medium on the solenoid valve is set to be somewhat less than the magnetically caused retention force, at which the solenoid valve assumes a closed position, depending on the desired solenoid valve setting, or is selected as somewhat greater than the magnetic retention force at which the solenoid valve is transferred into an open position.

The dosing system according to the invention thus does not require any external power supply at the location of the flow valve for opening and closing the flow regulating valve integrated inside the cartridge/needle configuration. It is only necessary to apply different pressure forces to the medium stored inside the cartridge in a suitable way.

For this purpose, the dosing system according to the invention provides, in at least one section along the hollow duct between the cartridge and the needle configuration, at least one first magnet unit mounted to be axially movable longitudinally to the flow direction of the medium through the hollow duct, which generates a first magnetic field. In addition, a second magnet unit provides a second magnetic field interacting with the first magnetic field in such a way that a magnetic force which mutually attracts the magnet units axially acts between the at least one first and the second magnet units. The second magnet unit is preferably integrated fixed in the hollow duct spaced apart axially from the at least one first magnet unit along the hollow duct. In addition, a mechanical stop is provided along the hollow duct, against which the at least one first magnet unit is drivable using a retention force which may be generated by the magnetic force. The at least one first magnet assumes an axial position, exclusively in which the at least one first magnet unit seals the hollow duct fluid-tight, while the medium loads the at least one first magnet unit to be pressurized axially against the action direction of the retention force. In contrast, if the at least one first magnet unit is to be axially spaced apart from the mechanical stop, by which the hollow duct is released and a media flow to the dosing needle is made possible, the pressure application on the medium is increased using the pressurizing means so that the pressure force exerted by the medium on the at least one first magnet unit is greater than the magnetic retention force. A unit which varies the pressure application on the pressurizing means is required for this purpose.

In an especially preferred embodiment, the pressurizing means which is used is a compressed air line, while the compressed air guided inside the compressed air line presses with an axial force application on the medium stored inside the cartridge. Depending on the setpoint of the air pressure prevailing along the compressed air line, the solenoid valve configuration described above may be opened or closed. Of course, other possibilities for pressure application on the medium are also conceivable, such as an axially guided piston unit.

The implementation of the dosing system according to the invention and the mode of operation on which the dosing system is based are explained in greater detail hereafter with reference to exemplary embodiments.

An alternative functional mechanism for pressure regulation is also described on the basis of an exemplary embodiment, in which closing and opening of the valve unit is made possible by exclusively employing magnetic forces.

DESCRIPTION OF THE DRAWINGS

The invention is described for exemplary purposes hereafter without restriction of the general idea of the invention on the basis of exemplary embodiments with reference to the drawings. In the figures.

DETAILED DESCRIPTION OF THE EXEMPLARY EMBODIMENTS

Figure 1:
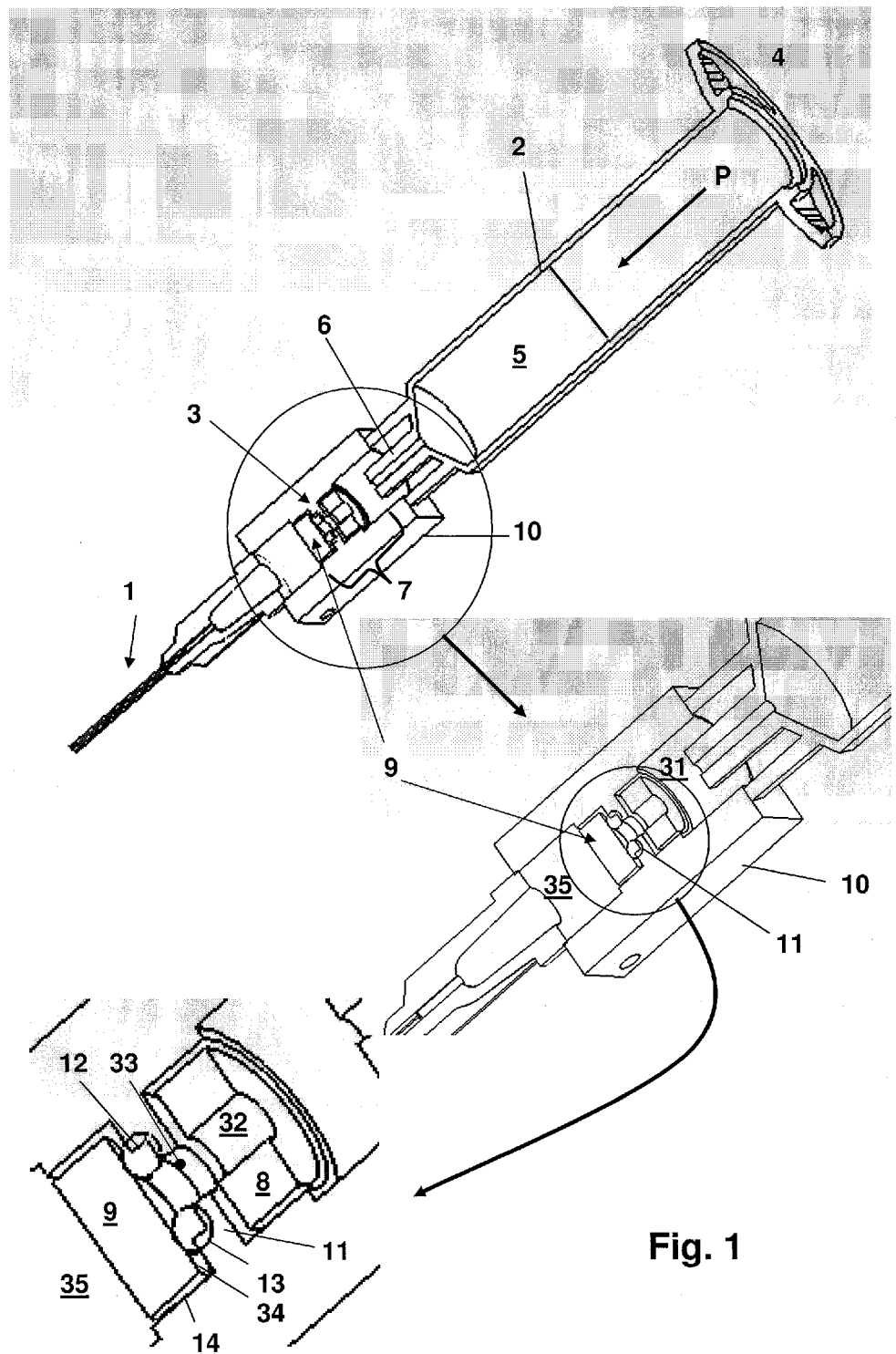
FIG. 1 shows a schematic longitudinal sectional illustration through the cartridge-needle configuration according to the invention.

A longitudinal sectional illustration of a dosing system implemented according to the invention is shown in FIG. 1 in three different enlargement stages, having a needle configuration 1 and a cartridge 2, which are both connected via a hollow duct 3 which connects the cartridge 2 and the needle configuration 1 to be fluid-tight. The cartridge end 4, which is implemented as open on the right side in the illustration in FIG. 1, is preferably connected to be air-tight to a compressed air line (not shown in greater detail), through which the medium 5 stored inside the cartridge 2 is dosed compressible at a pre-settable pressure p. The medium 5 located inside the cartridge 4, which may be liquid or gaseous in turn, is discharged through the left cartridge end 6, which is open as shown in FIG. 1, into a hollow duct 3, along which a solenoid valve configuration 7 is provided in the flow direction, whose mode of operation will be discussed in greater detail hereafter with reference to the longitudinal sectional illustration shown in the detail illustrations in FIG. 1.

Along the hollow duct 3, which is divided into five axial parts 31 to 35 for a simplified description, is a solenoid valve configuration 7 comprising at least one magnet units 8 and a second magnet unit 9 with the second magnet unit 8 being axially fixed in a modularly implemented housing unit 10 connecting the cartridge 2 and the needle configuration 1 to one another. The second magnet unit 8 is a ring magnet and has an inner hollow duct, which simultaneously forms a hollow duct section 32 along which the medium 5 may flow through, and which is discussed in greater detail hereafter. A spacer element 11 is downstream in the flow direction (see arrows) from the second magnet unit 8, which provides a centrally applied hole (like the second magnet unit 8), which adjoins the hollow duct section 32 which is axially aligned downstream as the further hollow duct section 33. The at least one first magnet unit 9 is in turn situated axially downstream from the spacer element 11 in the longitudinal extension of the hollow duct 3 and/or, with reference to the hollow duct sections 31 to 33, which are axially movable thereto. Both the at least one first and also the second magnet units 8 and 9 are each implemented as permanent magnets with their magnetic poles being oriented relative to one another in such a way that the magnetic fields of both magnet units generate a magnetic force which mutually attracts both magnet units. In the configuration shown in FIG. 1, this results in a displacement of the at least one first magnet unit 9 by the application of a magnetic force in the direction of the second magnet unit 8 and/or in the direction of the spacer element 11 provided between both magnet units. Furthermore, it may be seen from the detailed illustration in FIG. 1 that the spacer element 11 provides a grooved recess 12 radially enclosing the hollow duct section 33 on the side of the at least one first magnet unit 9, in which a sealing element 13 is inserted, preferably in the form of an elastically deformable O-ring.

In the state shown in FIG. 1, it is assumed that the first magnet unit 9 presses axially against the seal element 13 provided in the grooved recess 12 by application of force because of the attraction force caused by the magnetic force between both magnet units. The first magnet unit 9 separates the cavity area of the hollow duct sections 32 and 33 communicating with one another in a fluid-tight manner from a hollow duct section 34. The hollow duct section 34 is defined on one side by the first magnet unit 9, which is undersized in a recess 14 implemented (like a pocket hole) in the housing unit 10, and on the other side by the inner wall of the recess 14.

The solenoid valve unit 7 assumes a closed position, in which no medium may flow through the solenoid valve configuration 7.

However, because the medium loads the surface area of the first magnet unit 9 (shown as shaded in the largest detailed illustration), which is radially defined by the seal element 13. Even in the closed solenoid valve state via the hollow duct sections 31, 32, and 33 in the axial direction, the closed solenoid valve state may be ensured as long as the pressure force acting on the part of the pressurized medium on the axially movable first magnet unit 9 is less than the retention force caused by magnetic force, when the first magnet unit 9 axially presses against the seal element 3.

If the pressure force on the part of the medium is increased and exceeds the magnetic retention force, the first magnet unit 9 is axially displaced in the direction of the needle configuration 1, which causes an intermediate gap to be set between the first magnet unit 9 and the seal element 13, through which a medium flow finally results via the adjoining hollow duct sections 34 and 35, which finally results in the metered discharge of the medium through the needle configuration 1. As soon as the pressure force acting through the medium on the first magnet unit drops below the magnetic retention force again, the solenoid valve 7 closes automatically, in which the first magnet unit 9 is pressed, driven by magnetic force, to be fluid-tight against the seal element 13.

An axial return movement of the movably mounted first magnet unit 9, oriented against the flow direction of the solenoid valve 7, advantageously results in the generation of a partial vacuum inside the hollow duct area 35, which finally also results inside the needle configuration, so that the medium is retracted back into the needle upon closing of the solenoid valve configuration 7, by which interfering dripping may be avoided.

For the most rapid possible actuation of the dosing system according to the invention for discharging a plurality of extremely small media droplets in rapid chronological sequence, it is advantageous to select the operating pressure acting on the medium stored in the cartridge in such a way that the pressure force which may be generated with the aid of the pressurizing means inside the medium, which finally axially loads the longitudinally-movable first magnet unit 9, varies only slightly more or less around the magnetic force acting between both magnet units.

Multiple possibilities known per se suggest themselves for the variation of the pressure force, depending on the selection of the pressurizing means which is used. If a pressure application using air pressure is used, as already cited above, the air pressure may be regulated with the aid of a suitably selected regulated pump around a specific operating pressure, which corresponds to the magnetic retention force. It is also possible to perform the pressure application with the aid of a conventional piston instead of a compressed air line, which projects axially into the cartridge implemented to be open on one side, and suitably applies pressure to the medium stored therein. In this case, a corresponding actuator of the piston unit, which may be operated in a regulated way, is used for the pressure application.

Figure 2:
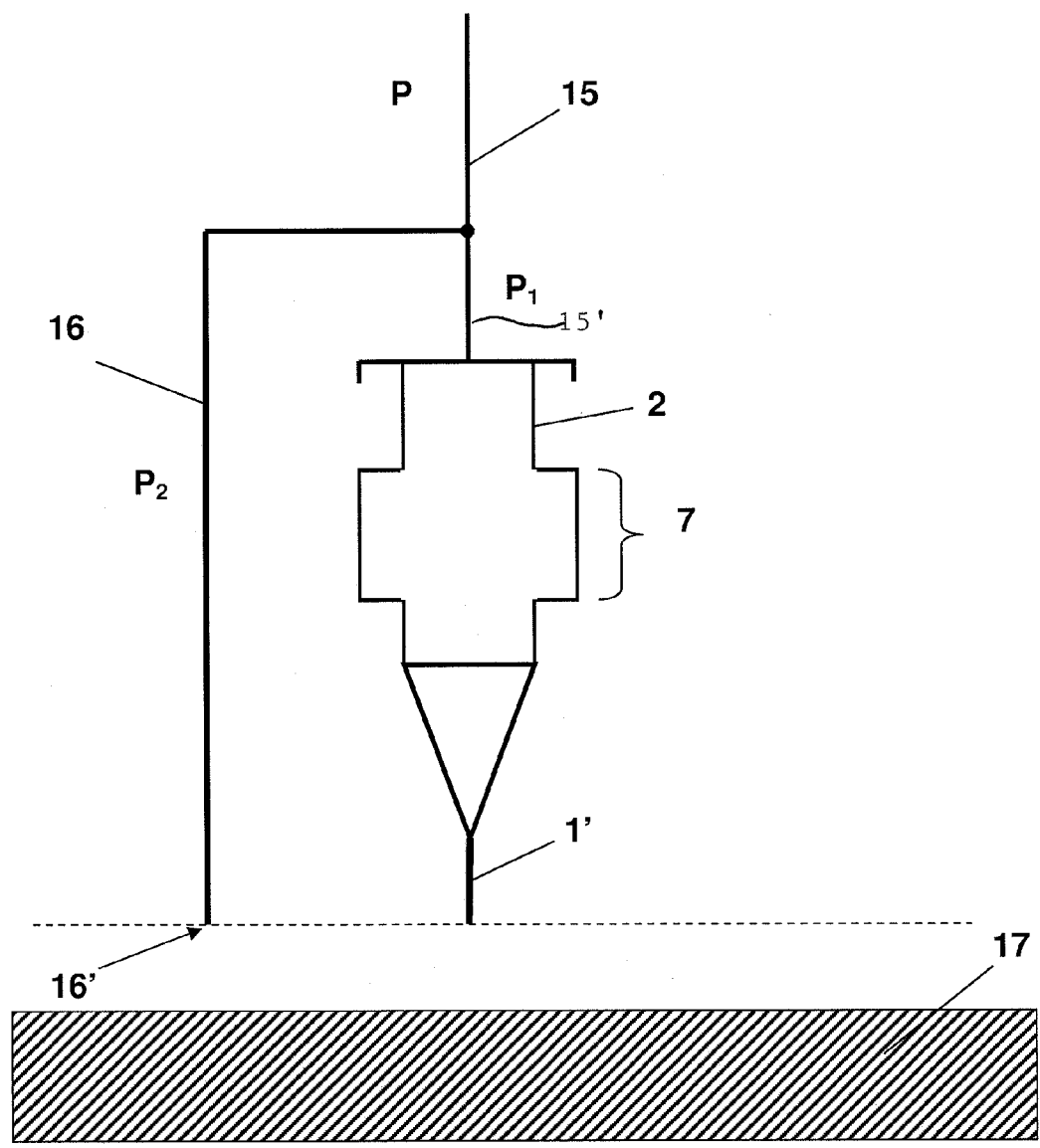
FIG. 2 shows a schematic illustration of a dosing system implemented according to the invention having a fluidic bypass line.

A further variation of the pressure application is described in greater detail hereafter with reference to FIG. 2.

It is also possible to set the magnetic force acting between both magnet units in a targeted way according to the setpoint of corresponding permanent magnets. This may be performed by distance variation of the two axially diametrically opposite magnet units 8 and 9, for example, by suitable thickness selection of the spacer element 11 extending in the axial direction.

Preferably, the housing unit 10 is implemented to be modular and be attached removably and fluid-tight via connection parts (not shown in greater detail) to both the needle configuration 1 on one side and to the cartridge 2 on the other side. Connection flanges known per se are suitable for this purpose, such as Luer-lock connections. Depending on the medium to be discharged, in particular with regard to the viscosity of the medium, the flow cross-sections along the hollow duct sections 31 to 35 described above beginning, but particularly also the axial thickness of the spacer element 11, may be selected to set the magnetic retention force between the magnet units 8 and 9 dimensioned as desired.

As a further measure for setting the pressure force loading the movable situated magnet unit 9 on the part of the medium, the cross-section of the hollow duct be dimensioned correspondingly in the hollow duct sections 32 and 33. For example, if the highest possible pressure force is to be generated, the flow cross-section through the hollow duct sections 32 and 33 is selected to be greater. In this case, the retention force generated by magnetic force also decreases, particularly because the magnetic volume in the magnet unit 8 also decreases.

A schematically shown dosing system implemented according to the invention is shown in FIG. 2, comprising the needle configuration 1, the solenoid valve configuration 7, and the cartridge 2, which is connected for the pressure application via its open cartridge end 4 to a compressed air line 15. A bypass line 16 is provided along the compressed air line 15, so that downstream from the branching point 17, the air pressure p provided along the compressed air supply line 15 is divided into the partial pressures p1 and p2 prevailing along the particular continuing lines 16 and 15'. The air pressure p1 prevailing along the partial supply line 15' is selected in particular so that the pressure force caused in this way is less than the retention force acting inside the solenoid valve configuration 7 between the two magnet units explained above, so that the solenoid valve assumes a closed state. The bypass line 16 in turn has an open-mouthed line end 16', which has a defined vertical distance to the needle tip 1'. The line end 16' and the needle tip 1' are preferably located on a uniform level (see dashed line). By approaching or placing the dosing systems schematically shown in FIG. 2 on the surface of a substrate 17, the backup pressure increases on the line end of the bypass line 16, by which the pressure along the partial supply line 15' rises. The magnetically generated retention force on the part of the pressure force exerted by the medium on the longitudinally movable magnet unit is thus exceeded, by which the solenoid valve 7 opens. Upon lifting of the dosing system from the surface of the substrate 17, the pressure force loading the movable magnet unit through the medium is decreased similarly and the valve closes automatically.

Figure 3:
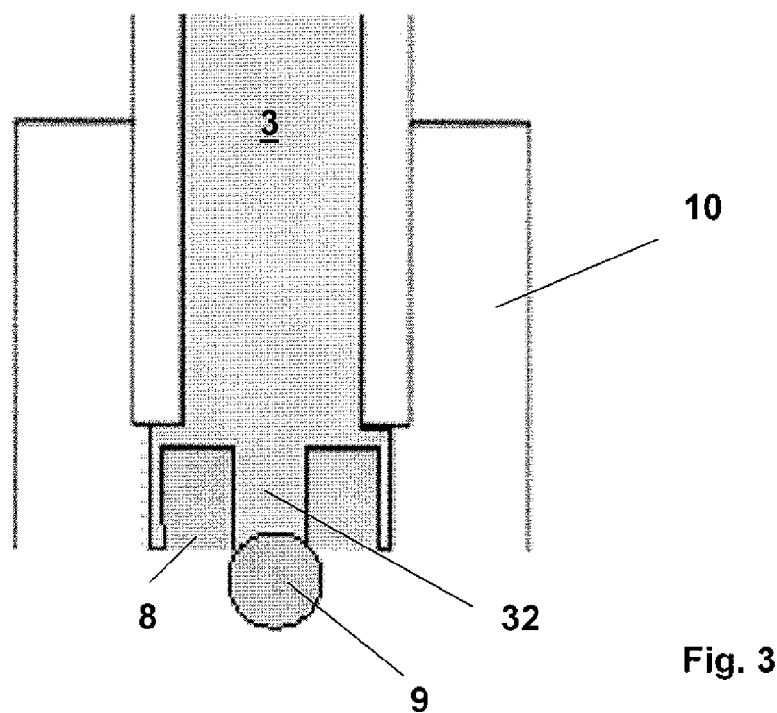
FIG. 3 shows a longitudinal sectional illustration through a valve unit in the area of the magnet configuration.

FIG. 3 shows a very schematically detailed longitudinal section through a valve configuration in the area of the first and second magnet units. Specifically, it is assumed that the second magnet unit 8 which is situated fixed in the hollow duct 3, has a hollow duct section 32 defining the hollow duct 3, on whose flow-side outlet a spherically implemented first magnet unit 9 is provided. The first magnet unit 9 has a maximum ball diameter which is dimensioned larger than the flow cross-section through the hollow duct section 32 of the second magnet unit 8. In this way, the attractive magnetic retention force acting between the magnet units 8 and 9 is prevented from being capable of pulling the freely-movable first magnet unit 9 into the hollow duct section 32. On the other hand, it is ensured that in the event of a tight pressing contact between the spherical first magnet unit 9 and the passage opening of the second magnet unit 8, implemented as circular in cross-section, a fluid-tight terminus is produced between both magnet units. To improve the fluid tightness, it is additionally possible to lightly chamfer the edge of the outlet opening on the magnet unit 8, so that in the event of a tight pressing state between the spherically implemented first magnet unit 9 and the second magnet unit 8, no fluid flow occurs through the valve configuration (as is the case in the illustration according to FIG. 3). In contrast, if the flow pressure is increased above the magnetic retention force between both magnet units, for example, the spherically implemented magnet unit 9 yields laterally to the flow direction as usual and remains automatically adhering on the lower annular circular face of the second magnet unit 8 in the flow direction. To keep the first magnet unit from actually being entrained by the fluid flow in the event the spherical first magnet unit 9 is completely detached from the second magnet unit 8, corresponding precautions are taken downstream from the second magnet unit 8 to leave the spherical magnet unit 9 appropriately close to the magnet unit 8.

FIGS. 4a through c show three sequential images in chronological sequence, each of which shows a schematic longitudinal section through a refinement according to the invention of the valve configuration. The repeated explanation of the components of the valve configuration already described having the known reference numerals is dispensed with for reasons of repetition and reference is made to the preceding description.

Figure 4:
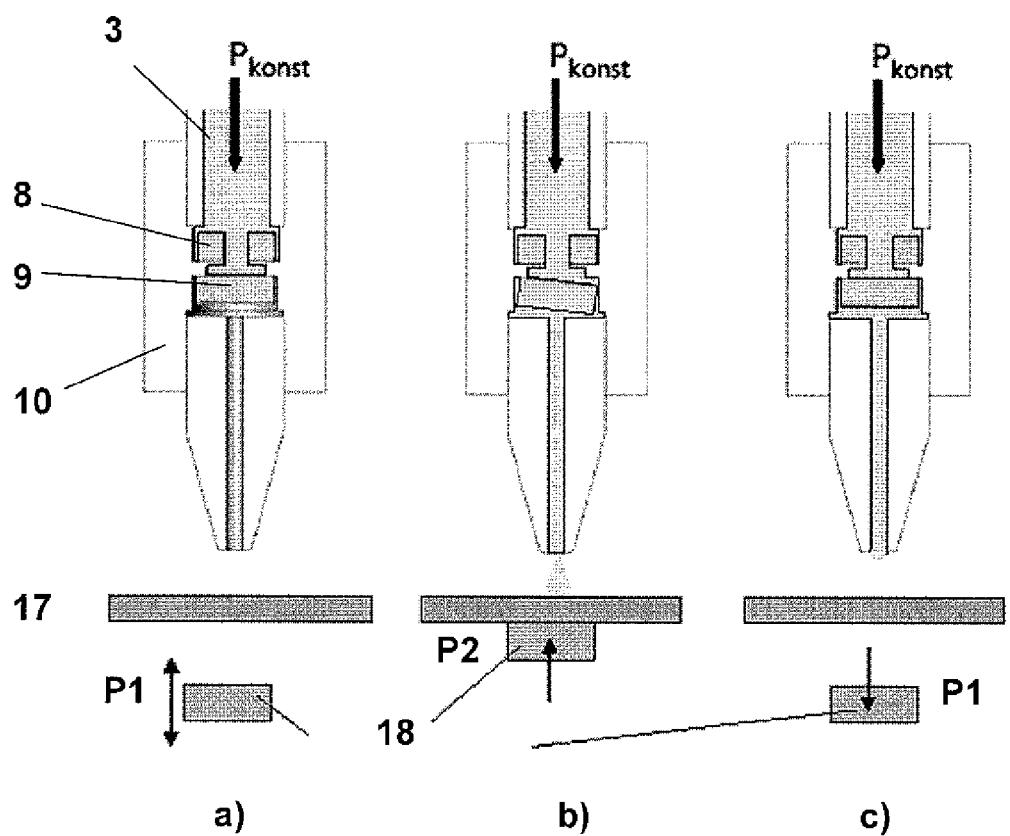
FIG. 4 shows a sequential image illustration of the opening and closing of an alternative valve configuration.

In contrast to the activation of the valve configuration via a pressure regulation along the flow channel, it is assumed that in the case of FIG. 4, the operating pressure p, at which a fluid to be discharged to the valve configuration is applied along the hollow duct 3, is constant.

To open the valve configuration, an additional force directed toward the movably situated first magnet unit 9 is to be generated, which is capable of reducing the retention force acting between both magnet units 8 and 9, at least enough that the movable magnet unit 9 is spaced apart from the second magnet unit 8 by the constant operating pressure p. For this purpose, for example, an external magnet unit 18 is provided below the substrate 17, which is mounted so it is at least linearly movable in the specified way and is temporarily transferable from a first position P1 remote from the valve configuration into a second position P2, in which the external magnet unit 18 assumes a shortened distance to the valve unit, by which an active external magnetic field due to the external magnet unit 18 prevails at the location of the first magnet unit 9, which is capable of helping to deflect the magnet unit 9 together with the prevailing operating pressure p against to the retention force between the first and second magnet units. This situation is shown in FIG. 4b. If the valve unit is to be closed, the external magnet unit 18 only has to be moved away from the valve unit as shown in FIGS. 4a and 4c. It is thus assumed that the external magnet unit 18 is implemented as a permanent magnet and a linear deflection is mechanically triggered axially to the longitudinal extension of the hollow duct 3 in a suitable way. Alternatively, however, it is also possible to implement the external magnet unit 18 as an electromagnet unit, so that the axial magnet deflection shown in FIGS. 4a through *c* is not necessary. In this case, only an activation or deactivation of the correspondingly provided electromagnet is necessary.

Representative for all possible embodiments is that preferably the first magnet unit 9, which is situated so it is movable in relation to the second magnet unit 8, does not necessarily have to comprise a permanent magnet. Rather, the mode of operation described above may also be implemented if the second magnet unit 8 is implemented as a permanent magnet and the first magnet unit 9 at least has ferromagnetic material.

The dosing system according to the invention allows use both for liquid and also gaseous media, which are to be discharged in dosed form via a cartridge-needle configuration, by a suitably selected sealing means. As a function of the opening and closing times with which the solenoid valve implemented according to the invention is operable, very fine, reproducible timely material discharges in the form of so-called dots and also material lines may be discharged in dosed form on corresponding substrate surfaces. A rapid pressure dissipation is achieved inside the needle configuration during the closing procedure by the return movement, oriented against the flow direction, of the magnet unit positioned so it is axially longitudinally movable, which simultaneously results in a retraction of the medium located inside the needle tube, by which dripping may be completely prevented.

Furthermore, the valve unit according to the solution has especially high closing and opening dynamics, that is, the response times for opening and medium flow immediately following thereon are especially short. This is because, in the closed state of the valve unit, the medium applies pressure to the axially movable first magnet unit. Only a small additional flow pressure exceeding the magnetic retention force is required to open the valve unit, which is applied by the medium flowing through the valve unit in the open state itself, however.

Completely dispensing with electrically activatable components is a special advantage of the dosing system implemented according to the invention, so that no heat generation occurs, which negatively influences the dosing result. This is also the reason for the low susceptibility to malfunction of the dosing system, particularly because its mode of operation is exclusively based on the settable balance between the flow pressure prevailing through the medium to be discharged and the magnetic force acting between both magnet units. This nearly energetically autonomous mode of operation of the dosing system also offers the ideal conditions for a cost-effective implementation, for example, in the form of a disposable system, particularly because the requirement is to be placed on disposable systems that they are not to have any high-value components which are possibly to be disposed of separately. Good dynamic properties are thus also achievable. The dosing system according to the invention is also ideally suitable for mass production in a large piece count.

The dosing system according to the invention either offers the possibility of implementing the needle configuration, the solenoid valve configuration, and also the cartridge as a uniform, compact construction, or manufacturing them in the form of separate modular components. In the latter case, the solenoid valve configuration is adaptable to needle configurations and cartridge configurations known per se via suitable selectable standardized flange connections. In addition, the modular construction allows simple handling, cleaning, and maintenance as well as an adaptation to different cartridge sizes.

The solenoid valve unit integrated in the dosing system has a modular construction itself, which on the one hand allows manufacturing without problems, and on the other hand also allows cleaning or maintenance of the individual components of the valve unit without great expenditure of work. Thus, depending on the current usage and operating conditions, individual components of the solenoid unit may be selected and replaced. For example, a replacement of the spacer element by another suitable selected spacer element is readily possible. The production costs may also be kept low by the easy and non-problematic assembly, by which the solenoid valve unit according to the invention is especially well suitable for implementation as a disposable article, which may be manufactured in large piece counts.

Due to the high capability for integration and ability to miniaturize the dosing system according to the invention, it is additionally possible to combine multiple valve configurations into an array dispenser tool, to allow parallel dispensing of a medium at different points in each case on a substrate, for example.

LIST OF REFERENCE NUMERALS 1 needle configuration
2 cartridge
3 hollow duct
4 open cartridge end
5 medium
6 open cartridge end
7 solenoid valve configuration
8 second magnet unit
9 first magnet unit
10 housing unit
11 spacer element
12 grooved recess
13 seal element
14 pocket hole
15 compressed air line
16 bypass line
16' open bypass line end
17 substrate

The invention claimed is:

1. A valve unit for interrupting or releasing a pressurized flow of a medium flowing along a hollow duct, comprising:
at least one section along the hollow duct including at least one first magnet unit which generates a first magnetic field and which is axially movable at least along a pressurized flow direction of the medium through the hollow duct;
a second magnet unit which generates a second magnetic field interacting with the first magnetic field so that a magnetic force mutually axially attracting the magnet units acts between the at least one first and the second magnet units;
a mechanical stop in the hollow duct, against which the at least one first magnet unit is drivable by a retention force which is generated by the magnetic force, and the at least one first magnet unit assumes an axial position, exclusively at which the retention force axially moves the at least one first magnet unit in the hollow duct to seal the hollow duct to be fluid-tight, while the medium loads the at least one first magnet unit to be pressurized axially against a direction of action of the retention force;
a unit for generating a variable force acting against the retention force on the at least one first magnet unit to control opening and sealing of the hollow duct; and
a spacer located in the hollow duct between the at least one first magnetic unit and the second magnetic unit and at a position downstream from the second magnetic unit during the pressurized flow, the spacer permitting flow of the medium in the hollow duct around or through the spacer and with the at least one first and the second magnetic units being separated by an axial spacing during the pressurized flow of the medium, and wherein the retention force at the axial spacing between the at least one first and the second magnetic units is less than the retention force when the at least one first magnet unit seals the hollow duct.

2. The valve unit according to claim 1, wherein:
the second magnet unit is fixed along the hollow duct.

3. The valve unit according to claim 1, wherein:
the second magnet unit partially encloses the hollow duct annularly in at least one section or at least partially indirectly or directly defines the hollow duct.

4. The valve unit according to claim 1, comprising;
the spacer is fixed and has a thickness which provides at least part of the axial spacing and the retention force at the axial spacing.

5. The valve unit according to claim 4, wherein:
the fixed spacer comprises a perforated disc which radially encloses the hollow duct in a section.

6. The valve unit according to claim 5, comprising:
the fixed spacer is located at a channel cross-section of the hollow duct and a perforated disc which is smaller than a cross-section of the hollow duct at the hollow duct and along which the first magnet unit is axially movable.

7. The valve unit according to claim 4, comprising:
a sealing means disposed in the flow direction downstream from the spacer element and upstream from the at least one first magnet unit, the sealing means being pressed to be fluid-tight against the spacer element by the at least one first magnet unit, if the at least one first magnet unit is located in the axial position, exclusively in which the at least one first magnet unit seals the hollow duct to be fluid-tight.

8. The valve unit according to one of claim 1, wherein:
the hollow duct has a hollow duct cross-section, which is larger than a cross-section of the at least one first magnet unit, is disposed in the axial area of the hollow duct along which the at least one first magnet unit is mounted to be movable, to provide a cavity which may have medium flow therein which is radially between a hollow duct wall of the hollow duct and the at least one first magnet unit.

9. The valve unit according to one of claim 1, wherein:
a section of the hollow duct at which the at least one first and second magnet units are located is modular and is enclosed by a housing providing two attachment adapters for a fluid-tight connection to a hollow line.

10. The valve unit according to claim 9, wherein:
the attachment adapters are Luer-lock attachments.

11. The valve unit according to claim 1, wherein:
the medium to be discharged in a dosed form is gaseous or liquid.

12. The valve unit according to claim 1, wherein:
one of the magnet units is a permanent magnet and the other magnet unit comprises ferromagnetic material.

13. The valve unit according to claim 1, wherein:
the unit with a variable force acting against the retention force on the at least one first magnet unit varies application of pressure on the medium.

14. The valve unit according to claim 13, wherein:
the unit is a pump for delivering the medium with a variable pressure through the hollow duct.

15. The valve unit according to claim 1, wherein:
the second magnetic unit is a permanent magnet or electromagnet unit, which is separate from the hollow duct and generates an external magnetic field which may be caused to interact with the at least one first magnet unit.

16. The valve unit according to claim 15, wherein:
the second magnet unit for generating the external magnetic field is movable in relation to the at least one first magnet unit and is transferable into at least first and second positions, the magnetic field at the first keeping the at least one first magnet unit in an open position, at which the at least one first magnet unit is spaced apart from the mechanical stop with the operating pressure loading the at least one the first magnet unit by the unit for generating a variable force acting against the retention force, and at the second position, the at least one first magnet unit sealing the hollow duct to be fluid-tight.

17. The valve unit according to claim 1, wherein:
the at least one first magnet unit is spherical and has a ball diameter which is larger than a diameter if the hollow duct cross-section;
the second magnet unit sectionally encloses or forms the hollow duct; and
the at least one first magnet unit presses directly against the second magnet unit and seals the hollow duct to be fluid-tight.

18. A valve unit according to claim 1, comprising:
a dosing system for metered discharge of a medium from a cartridge and needle configuration, the cartridge being connected to the needle configuration via at least one hollow duct and including a cartridge end which is open, to which a pressurizing means is applied, for driving the medium by applying pressure inside the cartridge in the direction of the needle configuration for providing the metered discharge;
wherein the valve unit is disposed along the hollow duct; and comprises
the unit for generating a variable force comprises means for varying application pressure applied to the medium, or an external permanent or electromagnetic unit, positioned separately from the hollow duct and which generates an external magnetic field, which interacts with the at least one first magnet unit for deflecting the at least one first magnet unit against the retention force jointly with the means for varying application pressure.

19. The valve unit according to claim 18, wherein:
the means for varying application pressure is a piston unit providing pressure axially in the cartridge which is open on one side to the medium stored therein.

20. The valve unit according to claim 18, wherein:
the means for varying application pressure comprises a pressurized fluid line, which is attached to the cartridge which is open on one side; and
the pressurized fluid in the pressurized fluid line acts on the medium stored in the cartridge.

21. The valve unit according to claim 20, comprising:
a fluid bypass line disposed along the fluid line upstream from a connection to the cartridge through which a part of the fluid flow passing in the fluid line may be diverted; and
the fluid bypass line has an open line end which is adjacent to a needle of the needle configuration.

22. The valve unit according to claim 18, wherein:
the means for varying application pressure provides a variable or switchable pressure force acting through the means for varying application pressure on the at least one first magnet unit from a force value which is greater than the retention value force to a force value which is less than the retention value force and vice versa.

23. The valve unit according to claim 18, wherein:
the external magnet unit is spaced apart from the needle configuration and opposite thereto in a longitudinal needle direction.

24. The valve unit according to claim 23, wherein:
the external magnet unit is axially movable between at least first and second positions in a longitudinal needle direction, the first position providing the external magnetic field which maintains the at least one first magnet unit in an open position, at which the at least one first magnet unit is spaced apart from the mechanical stop by the axial spacing, with the operating pressure loading the at least one first magnet unit by the means for varying application pressure against the retention force, and at the second position, the first magnet unit sealing the hollow duct to be fluid-tight.

* * * * *